United States Patent [19]

Ling

[11] Patent Number: 4,963,015
[45] Date of Patent: Oct. 16, 1990

[54] RECORDING AND REPRODUCTION OF IMAGES

[75] Inventor: William Ling, London, England
[73] Assignee: Aspex Limited, England
[21] Appl. No.: 318,925
[22] Filed: Mar. 6, 1989

[30] Foreign Application Priority Data

Jun. 22, 1987 [GB] United Kingdom ............... 8714546

[51] Int. Cl.$^5$ ........................................... G03B 35/00
[52] U.S. Cl. ...................... 352/57; 352/60; 352/62; 352/86; 352/43; 352/45; 352/46; 352/213
[58] Field of Search ...................... 352/57, 60, 45, 43, 352/46, 86, 66, 213, 62

[56] References Cited

U.S. PATENT DOCUMENTS 2,738,377  3/1956  Weighton ............................ 352/66

FOREIGN PATENT DOCUMENTS 1050700  1/1954  France ................................ 352/213
24645  of 1911  United Kingdom ................. 352/213

Primary Examiner—Monroe H. Hayes
Attorney, Agent, or Firm—Kirschstein, Ottinger, Israel & Schiffmiller

[57] ABSTRACT

A method of recording an image of a scene onto cinematographic color film comprises forming a number of successive partial images through a single lens system onto each single frame of the film, the successive partial images being recorded in light of different characteristics, for example different colors. The film is projected using a conventional projector, and when viewed through appropriate filters, gives a stereo scopic effect. To get an optimum effect, the sequence in which the images are recorded should be appropriate to the predominant direction of horizontal movement in the scene. Accordingly in one form of the invention, each image is divided into a number of areas, each area in successive images being recorded in light of different characteristics, and each image having different areas recorded in light of different characteristics. In another form of the invention, two successive series of images are formed on each time, or on alternate frames, the first series of images being formed sequentially in the reverse order. Filter members for use in a film camera for carrying out the method are described.

13 Claims, 2 Drawing Sheets

RECORDING AND REPRODUCTION OF IMAGES

BACKGROUND OF THE INVENTION

1. Field of the Invention

This invention relates to the recording and reproduction of images.

More particularly, the invention relates to a method of recording images on cinematographic film and a film camera for carrying out the method.

2. Description of Related Art

In published international patent application number WO 87/03972 there is described a method of recording images onto cinematographic film in which a number of successive images are formed through a single lens system onto each frame of the film, successive images being recorded in light of different characteristics. In one form of the invention, two or more successive images are formed on each frame in light of different colours. For example, two successive images may be formed in red and cyan light. When the film, after processing, is projected using a conventional projection system, the red and cyan images in each frame are projected simultaneously on the screen. If the screen is viewed through a pair of spectacles providing an appropriate filter for each eye of the viewer, so that the red image is presented to one eye and the cyan image presented to the other, a marked stereoscopic effect is produced, as a result of disparities in the images produced by any movement of objects in the scene, or movement of the camera, between the successive exposures on each frame.

For example, suppose an object is moving from left to right across the scene, and that two successive images are recorded successively on the film, first through a red and then through a cyan filter and subsequently the two filtered images in each frame are projected simultaneously on the screen. From the point of view of the camera, the red image will correspond to the image of the object as seen from a point slightly to the right, as compared with the cyan image, the degree of misalignment or disparity depending on factors such as the speed of movement of the object and its distance from the camera. If the superimposed images are viewed through spectacles so that the red image is presented to the right eye and the cyan image to the left eye of the viewer, then the crossed horizontal disparity between the images will be equivalent to that caused by viewing an object suspended in front of the projection plane simultaneously from points spaced to the right and left of a central position, as in normal binocular vision. If one now considers an object moving from right to left across the scene, the right and left eyes will again be presented with different images, but they will now correspond to the uncrossed disparate images of an object behind the projection plane. Since this is an improbable stimulus in normal binocular vision, it would be expected that no stereoscopic effect, or an incorrect stereoscopic effect, would be observed. Similarly, an object moving vertically in the scene would give rise to vertically disparate images, which would not be expected to give rise to a stereo-scopic effect. If the camera undergoes translatory motion while viewing a three-dimensional scene, all objects in the scene, except those at optical infinity, will give rise to disparate images on each frame, the disparity varying appropriately with the distance of the object from the camera. Camera motion in one direction (right to left in the system described above) will generate disparities of correct sign, which would give rise to a strong steroscopic sensation for the entire scene when the projected image is subsequently viewed. Camera motion in the opposite direction will reverse the sign of all disparities, which might be expected to produce a reversed steroscopic sensation.

In practice it is found that reversed stereopsis rarely if ever occurs and the stereoscopic sensation is appropriate in direction whatever the motion of object or camera. It appears that the strong monocular cues (e.g. linear perspective, relative size, motion parallax) determine the depth impression of the picture and any horizontal disparities in the image can enhance but not override the depth sensation.

SUMMARY OF THE INVENTION

The present invention is designed to make use of this effect, by providing on each frame of the film or on alternate frames, a succession of images recorded so that when the projected film is viewed through appropriate spectacles, stereoscopic information is provided which is appropriate both for objects moving from left to right as well as objects moving from right to left in the scene. This ensures, whatever the movement of the camera, or of objects in the field of view, the reproduced images have appropriate information to enable the viewer's brain to construct a correct stereoscopic image.

According to one aspect of this invention, there is provided a method of recording an image of a scene onto cinematographic film, comprising forming a number of successive images of the scene through a single lens system onto each frame of the film, each image being divided into a number of areas, each area in successive images being recorded in light of different characteristics, and each image having different areas recorded in light of different characteristics.

In one form of the invention, each area of each image is recorded in light of different colours. For example, in a two-colour system, two successive images may be formed on each frame of the film, each image being divided into an even number of areas, some of which are recorded in one colour in the first image, whilst the remaining areas are formed in light of the other colour, the colour of each area being changed in the second image. For example, in a system using red and cyan as the two colours, areas which are red in the first image would be cyan in the second image, whilst areas which are cyan in the first image would be red in the second image.

The areas need not be sharply defined. Where the images are formed through a rotating filter device, there may be some overlap between different areas of colour in each image. In one form of the invention, the images are formed through filters move successively into the path of the camera. The filters may be carried on a rotatable member. In one embodiment, the filter member is divided into part-annular areas. In another embodiment, the filter member consists of areas of different colours arranged in bands extending spirally with respect to the axis of rotation of the filter member.

The number of colours employed may be more than two. For example, a three colour system employing red, green and blue light could be provided. In that case, three successive images could be formed on each frame, each area of the images taking a different colour in each of the images.

The number of successive images need not be equal to the number of colours employed. For example, the number of images may be a multiple of the number of colours. In the limiting case, the colour of the various areas may be change gradually from one colour to another, giving in effect an infinite number of successive images on each frame. Instead of using different colours, different areas of the image could be recorded in light of different planes of polarisation, the projected image being then viewed through suitably arranged polarising filters.

It will be appreciated that, using the described methods, each frame will record both "normal" and "reversed" stereoscopic information for objects moving in either direction in the scene and for either direction of horizontal movement of the camera.

This effect can also be achieved, in accordance with another aspect of this invention, by forming on each frame of the film, or on alternate frames, two successive series of images, the first series of images being formed sequentially in light of different characteristics in one order, and the second series being formed sequentially in light of corresponding characteristics in the reverse order. For example, each may consist of images formed in the sequence cyan-red-red-cyan.

As with the previously described system, more than two colours could be used. Instead of colours, the images could be formed in light of different planes of polarisation.

The method could be carried out using filters arranged to be moved successively into the optical path of the camera, for example, using a rotating filter member.

The invention also includes filter members as defined above, and cameras incorporating the filter members.

BRIEF DESCRIPTION OF THE DRAWINGS

The invention will now be described, by way of example, with reference to the accompanying drawings, in which.

DETAILED DESCRIPTION OF THE PREFERRED EMBODIMENT

Figure 1:
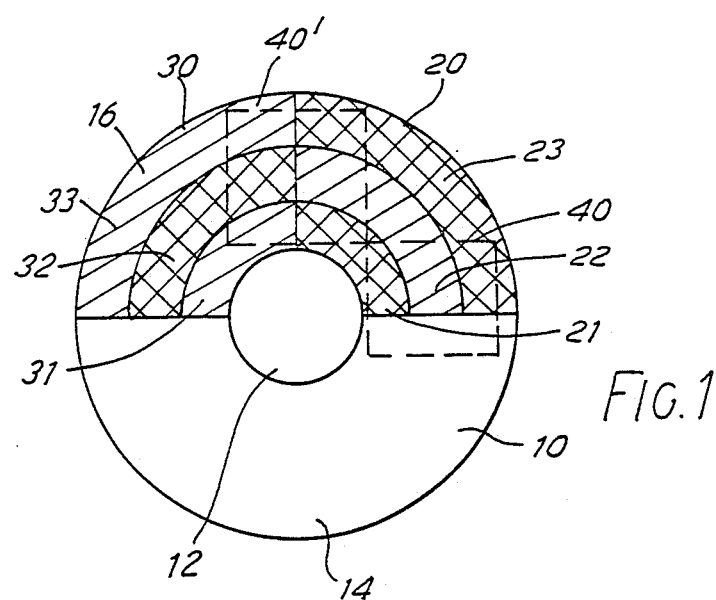
FIGS. 1-5 illustrate diagramatically different forms of filter member for use in the method of this invention.

FIG. 1 shows a disk shutter 10 designed to replace the shutter of a conventional film camera, for example, as described in the above mentioned patent application WO 87/039872. The disk shutter 10 has hub portion 12, an opaque shutter portion 14 and a transparent filter portion 16. The hub portion is designed so that the disk shutter can be fitted into the camera in the same way as the shutter which it replaces. The opaque portion 14 of the disk shutter occupies 180° degrees of the shutter and performs the same function as the convention camera shutter.

The filter portion 16 is divided into two portions 20 and 30, each occupying 90° of the shutter aperture. Portion 20 is itself divided into three part annular areas 21, 22 and 23 of different radii. The area 21 nearest the centre of the disk, and the outer area 23 are transparent to cyan light, whilst the intermediate area 22 is transparent to red light. The other portion 30 is similarly divided into three areas 31, 32 and 33, but in this case the inner area 31 and the outer area 33 are red whilst the intermediate area 32 is cyan.

The invention also includes filter members as defined above, and FIG. 1 shows a disk shutter 10 designed to replace the shutter of a conventional film camera, fed light. The other portion 30 is similarly divided into three areas 31, 32 and 33, but in this case the inner area 31 and the outer area 33 are red whilst the intermediate area 32 is cyan.

The disk shutter 10 is fitted into a conventional camera in place of the conventional shutter. In operation, the disk shutter 10 is driven to rotate at a constant speed so that the opaque portion 14 and the filter 16 pass successively between the lens and the film gate. The film drive mechanism advances the film whilst the opaque portion 14 is passing between the lens and the film gate and holds each film stationary in the gate, at a position diagrammatically indicated at 40 in FIG. 1, as the filter portions 20 and 30 pass successively between the lens and the gate. The film frame will therefore be exposed in light passing through each of the filter portions in turn, for a period equal to half the exposure time (ie for 1/100 second each, if the camera operates at 25 frames per second with a 180° shutter opening). The two images thus formed are overlaid on each frame of the film.

The first image formed on each frame will have three areas formed in colours corresponding to those of the three areas of filter portion 20. In the second image formed on the frame, each of those areas are formed in light of the other colour. Thus, the areas formed in cyan light in the first image are formed in red light in the second image, and the area formed in red light in the first image is formed in cyan light in the second image.

The two images recorded on each frame will usually represent different aspects of the screen being filmed, either because the camera moves during the 1/50 second exposure time or because one or more objects in the screen have moved, or a combination of the two.

When the developed film is projected onto a screen in the usual way, each projected frame will consist of the two images projected simultaneously onto the screen. If the screen is viewed for example through spectacles having a right lens consisting of a red filter and a left lens consisting of a cyan filter, then the viewers right eye will see an image consisting of the intermediate area of the first image of the frame and the inner and outer areas of the second image. The viewers left eye will see an image consisting of the inner and outer areas of the first image and the intermediate area of the second image. Each eye will therefore see a different aspect of the screen, owing to movement in the scene or movement of the camera. Unlike the system described in the above mentioned patent application WO 87/03972. each eye does not see only one of the first and second images, but a different combination of the two images.

Since the two colours used in the disk shutter are complementary, the combination of the superimposed images will give a full colour image.

In use of the disk shutter shown in FIG. 1, with the film gate in the position shown at 40 (which is the usual position in conventional film cameras), the areas of different colour in each of the two images on each frame will be separated horizontally rather than vertically. This means that the effect of providing "normal" and "reversed" stereoscopic information on each frame will apply to objects at different horizontal positions across the frame. It is thought that the effect of the invention could be further improved if the disk shutter were operated with the film gate at the position shown at 40' in FIG. 1 so that each horizontally moving extended contour in the original scene will be segmented into double images of vertically alternating crossed and uncrossed disparity. Thus each elongated contour would contain some appropriate stereoscopic information, which should lead to good overall stereopsis. This could be done by suitably adapting the camera, or by mounting the disk shutter in front of the camera lens, or at any other suitable position in the optical path of the camera, with a suitable drive mechanism to rotate the disk shutter in synchronism with the internal camera shutter.

Figure 2:
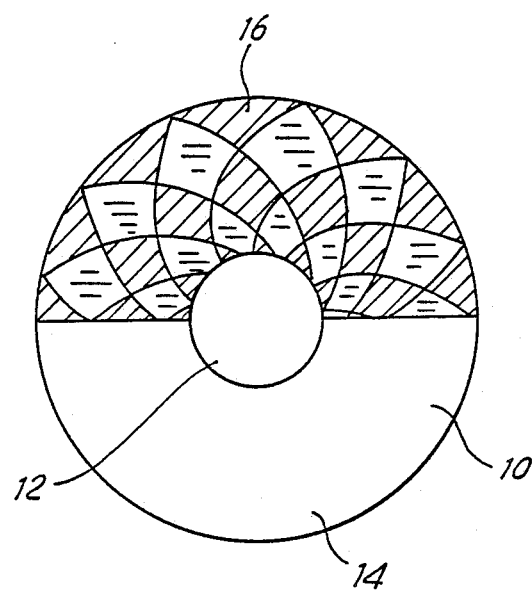

Alternatively, it may be possible to achieve the same effect by altering the shape of the areas of different colour of the filter disk, for example to a diamond shape pattern as illustrated in FIG. 2.

It will be appreciated that the shape and number of the different areas of the filter disk could be varied, as could the colours employed. Instead of the two colour system, three or more colours could be used. Some of the areas could be transparent to white light, to reduce the effect of the "fringes" caused by the misalignment between the superimposed images in each frame, to make the projected image more acceptable to the viewer who does not use filter spectacles and to enhance the perceptual sharpening of moving images produced by the decomposition of blur into multiple fringes. The different areas in the filter disk of FIG. 1 could be in other complementary colours, or could be for example red or green with a central portion of the filter, between the portions 20 and 30, being blue to provide full colour images.

The disk shutter shown in FIG. 1 could be provided with a mechanism to vary the shutter "speed" (i.e. duration of exposure) by varying the angle of the transparent part of the shutter, as with a conventional camera shutter. If the angle is varied by moving two opaque vanes equally from each end of the transparent part of the shutter, the colour balance of the disk shutter will not vary with varying shutter angle, since the red and cyan areas will be covered equally by the vanes.

Figure 3:
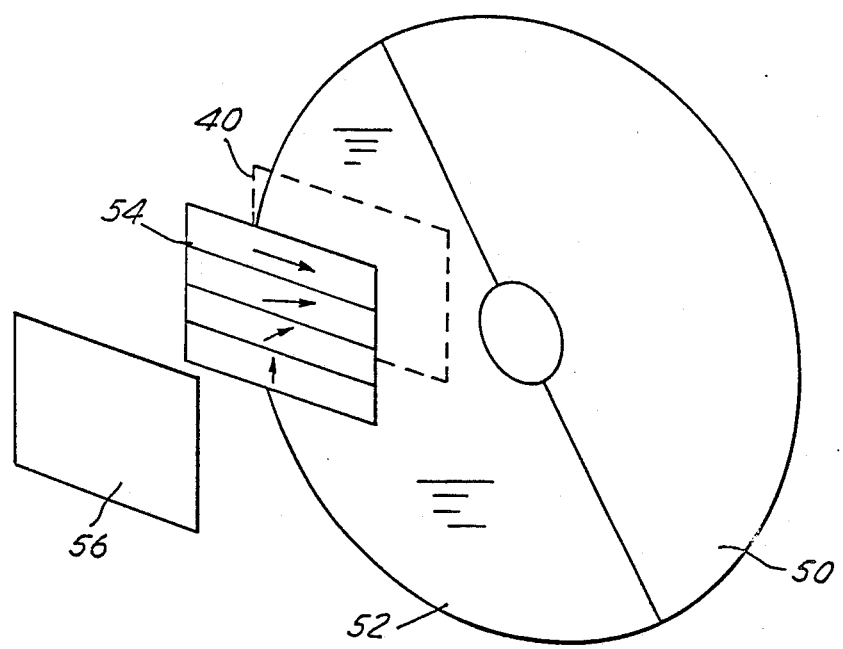

FIG. 3 illustrates diagrammatically an alternative embodiment which has an effect similar to that of the shutter shown in FIG. 1. The shutter is replaced by a shutter 50 having a transparent portion 52 consisting of plane polarising material. In front of the film gate 40 is an element consisting of a sheet of birefringent material 54 and a second polarising sheet 56. The sheet 54 consists of strips of birefringent material having optical axis at angles which gradually change from horizontal to vertical from the top to the bottom of the sheet, as shown by the arrows in the FIG. The colour of light passing through strips and the two polarisers 52 and 56 will therefore vary from strip, to strip, so that the image formed on the film consists of areas formed in light of different colours. As the disk shutter 50 rotates, the plane of polarisation of light passing through the portion 52 changes, so that the colour of light transmitted through the strips of sheet 54 also changes. The colours of the different areas of the image will therefore change as the shutter rotates, giving rise to a continuous series of images rendered in different colour. This technique could be used to produce other combinations and sequences of colour. The various elements could be mounted at any suitable position in the optical path of the camera.

Figure 4:
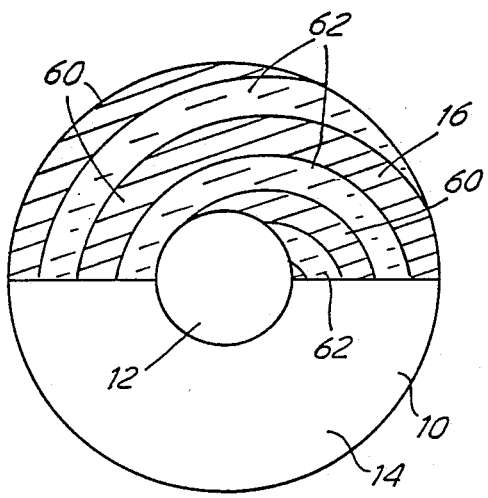

FIG. 4 shows an alternative form of disk shutter in accordance with the invention, in which the transparent portion 16 of the shutter is formed of strips of different colour filters extending spirally around the axis of the disk. In the embodiment shown, strips 60 of cyan filter material alternate with strips 62 of red. Unlike the disk shutter of FIG. 1, the shutter shown in FIG. 4 will not produce a succession of discrete images on each frame, but will in effect produce an infinite sequence of images, each formed of areas of different colour, the areas changing continuously during the period of exposure of the frame. The number of colour used, and the shape an arrangement of the spiral strips, can be chosen to provide an adequate stereoscopic effect when the film is viewed through spectacles whilst enabling the film to appear satisfactory when viewed without spectacles.

Figure 5:
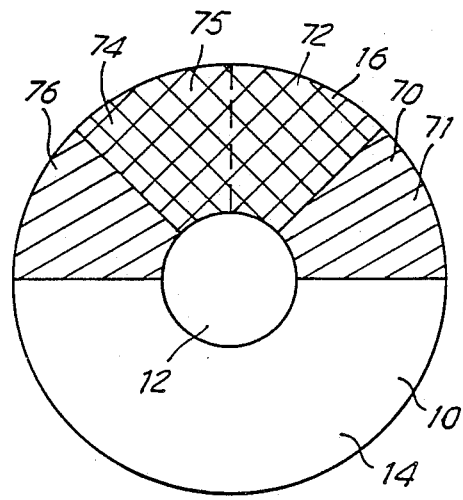

FIG. 5 illustrates an alternative form of the invention, in which the transparent portion 16 of the disk shutter has two portions 70 and 74 each occupying half the angular extent of the transparent portion. Portion 70 is itself divided into 2 equal areas, a cyan area 71 and a red area 72, divided by a radius of the disk. Portion 74 is similarly divided into a red area 75 and a cyan area 76, the sequence of the two colours being reverse as compared with portion 70. Since the two red areas 72 and 75 are adjacent, the transparent section is in practice made up of three filter sections. In use of this disk shutter, each frame has in effect a sequence of superimposed images in the sequence cyan-red-red-cyan. Each frame will therefore give both a "normal" and "reversed" set of disparate images for objects moving both from left to right and from right to left in the screen. It will be appreciated that the number of colours, and the number of areas of colour in the transparent portion of the disk shutter can be varied, without affecting colour rendition of stationary objects, provided that there is an even number of sequences of colours arranged in opposite order. In addition, clear areas, or areas of neutral density, or of a third colour could be included in the transparent portion of the disk.

It will be appreciated that each of the described disc shutters could be modified for use with a camera having a "butterfly" shutter, by providing two similar filter portions on the disc. Alternatively, the sequence of different colour filters could be in opposite directions in the two filter portions of the butterfly shutter, so that alternate frames have stereoscopic information appropriate to movement in the scene from left to right. The filter disc could take the place of the butterfly shutter.

Instead of using movable filter member, the filter member could be a solid state colour filter, such as a pi-cell, or an array of such filters, suitable electronic circuitry being provided to control the filter or filters in synchronism with the camera shutter.

I claim:

1. A method of recording onto cinematographic film an image of a scene including at least one object moving relative to the film, the method comprising the steps of:
    (a) forming onto each single frame of the film a plurality of partial images of the scene, including partial images of the object, taken at successive intervals of time;
    (b) said partial images of the scene being overlaid on each said frame so that the partial images of the object are displaced in position relative to one another owing to the relative movement between the object and the film in the or each time interval between the formation of the successive partial images;

(c) each said partial image of the scene being divided into a number of areas;
(d) said successive partial images of the scene in each said area being recorded in light of different colours, said different colours being selected so that the overlaid partial images of the scene in each area combine to form a full colour image reproduction of the image;
(e) one of said areas in each partial image of the scene being recorded in light of a different colour from that of at least one other of said areas, so that the sequence of colours in which said plurality of successive partial images of the scene are recorded in said one area is different from the sequence of colours in which the said plurality of successive partial images are recorded in said other area;
(f) whereby, when the image is reproduced and viewed through filter spectacles allowing the left and right eyes of the viewer to see different ones of the partial images of the scene or different combinations thereof, a stereoscopic effect is obtained.

2. A method as claimed in claim 1, in which the images are formed through filters successively interposed between the lens and the film.

3. A moving colour film camera, comprising:
(a) a mechanism for interposing a number of colour filters in an optical path of the camera successively during the exposure of each single frame of the film, for forming onto each single frame of the film a plurality of partial images of a scene, including partial images of at least one object moving relative to the film, taken at successive intervals of time;
(b) said partial images of the scene being formed by light passing through said colour filters and being overlaid on each frame, so that said partial images of said object are displaced in position relative to one another owing to the relative movement between the object and the film in the or each time interval between the formation of successive partial images;
(c) each said partial image of the scene being divided into a number of areas;
(d) said successive partial images of the scene in each said area being recorded in light of different colours, said different colours being selected so that the overlaid partial images of the scene in each area combine to form a full colour image reproduction of the image;
(e) one of said areas in each partial image of the scene being recorded in light of a different colour from that of at least one other of said areas, so that the sequence of colours in which said plurality of successive partial images of the scene are recorded in said one area is different from the sequence of colours in which the said plurality of successive partial images are recorded in said other area;
(f) whereby, when the image is reproduced and viewed through filter spectacles allowing the left and right eyes of the viewer to see different ones of the partial images of the scene or different combinations thereof, a stereoscopic effect is obtained.

4. A camera as claimed in claim 3, in which the said colour filters comprise areas of different colours forming part-annular areas of a filter member.

5. A camera as claimed in claim 3, in which said colour filters comprise areas of different colour arranged in bands extending spirally with respect to the axis of rotation of a filter member.

6. A method of recording onto cinematographic film an image of a scene including at least one object moving relative to the film, the method comprising the steps of:
(a) forming onto each single frame of the film a first series of partial images of the scene, including partial images of the object, taken at successive intervals of time;
(b) forming onto each said frame of the film a second series of partial images of the scene, including partial images of the object, taken at successive intervals of time after the partial images of the first series have been taken;
(c) said first and second series of partial images being overlaid on each said frame, so that the partial images of the object in each of said first and second series are displaced in position relative to one another owing to the relative movement between the object and the film in the or each time interval between the formation of the successive partial imates in each series;
(d) said successive partial images of the scene in said first series being recorded in light of different colours in a predetermined sequence, said different colours being selected so that the overlaid images of the scene in said first series combine to form a full colour image on reproduction of the image;
(e) said successive partial images of the scene in said second series being recorded in light of said different colours, in a sequence which is the reverse of the predetermined sequence of colours for the first series of partial images;
(f) whereby, when the image is reproduced and viewed through filter spectacles allowing the left and right eyes of the viewer to see different ones of the partial images of the scene or different combinations thereof, a stereoscopic effect is obtained.

7. A method of recording onto cinematographic film an image of a scene including at least one object moving relative to the film, the method comprising the steps of:
(a) forming onto each single frame of the film series of partial images of the scene, including partial images of the object, taken at successive intervals of time;
(b) said partial images of the scene being overlaid on each said frame so that the partial images of the object are displaced in position relative to one another owing to the relative movement between the object and the film in the or each time interval between the formation of the successive partial images;
(c) said successive partial images being recorded in light of different colours, said different colours being selected so that the overlaid partial images combine to form a full colour image on reproduction of the image;
(d) the series of partial images being recorded in first and second predetermined sequences respectively on alternate frames of the film, the sequence of colours in which the successive partial images are recorded in the second predetermined sequence being in the reverse order to the sequence of colours in which the successive partial images are recorded in the first predetermined sequence;
(e) whereby, when the image is reproduced and viewed through filter spectacles allowing the left and right eyes of the viewer to see different ones of the partial images or different combinations thereof, a stereoscopic effect is obtained.

8. A moving colour film camera, comprising:

(a) a mechanism for interposing a number of colour filters in an optical path of the camera successively during the exposure of each single frame of the film, for forming onto each single frame of the film first and second series of partial images of a scene, including partial images of at least one object moving relative to the film, taken at successive intervals of time;

(b) said partial images of the scene in each said series being formed by light passing through said colour filters and being overlaid on each frame, so that said partial images of said object are displaced in position relative to one another owing to the relative movement between the object and the film in the or each time interval between the formation of successive partial images;

(c) said successive partial images in each series being recorded in light of different colours, said different colours being selected so that the overlaid partial images combine to form a full colour image on reproduction of the image of the object;

(d) said mechanism being operable to interpose said filters in sequence such that the sequence of colours in which the second series of partial images of the scene is recorded is in the reverse order to the sequence of colours in which the first series of partial images of the scene is recorded;

(e) whereby, when the the image is reproduced and viewed through filter spectacles allowing the left and right eyes of the viewer to see different ones of the partial images or different combinations thereof, a stereoscopic effect is obtained.

9. A film camera as claimed in claim 8, in which the filters are carried on a rotatable member so that on rotation of the filter member the filters are moved successively into the optical path of the camera.

10. A moving colour film camera, comprising:

(a) a mechanism for interposing a number of colour filters in an optical path of the camera successively during the exposure of each single frame of the film, for forming onto alternate frames of the film respectively first and second series of partial images of a scene, including partial images of at least one moving relative to the film taken at successive intervals of time;

(b) said partial images of the scene in each said series being formed by light passing through said colour filters and being overlaid on each frame, so that said partial images of said object are displaced in position relative to one another owing to the relative movement between the object and the film in the or each time interval between the formation of successive partial images;

(c) said successive partial images in each said series being recorded in light of different colours, said different colours being selected so that the overlaid partial images combine to form a full colour image on reproduction of the image of the object;

(d) said mechanism being operable to interpose said filters in sequence such that the sequence of colours in which the second series of partial images of the scene is recorded is in the reverse order to the sequence of colours in which the first series of partial images of the scene is recorded;

(e) whereby, when the image is reproduced and viewed through filter spectacles allowing the left and right eyes of the viewer to see different ones of the partial images or different combinations thereof, a stereoscopic effect is obtained.

11. A moving film camera as claimed in claim 10, in which the filters are carried on a rotatable member so that on rotation of the filter member the filters are moved successively into the optical path of the camera.

12. A camera as claimed in claim 11, and having a butterfly shutter, in which the filter member is a disc having two diametrically opposite filter portions corresponding to the open areas of the shutter, or is formed in one with the shutter.

13. A camera as claimed in claim 12, in which the colour filters in one of the filter portions are arranged in the opposite sequence to that of the colour filters in the other filter portion.

* * * * *